United States Patent [19]

Sircar et al.

[11] 4,013,429
[45] Mar. 22, 1977

[54] FRACTIONATION OF AIR BY ADSORPTION

[75] Inventors: Shivaji Sircar, Allentown; John W. Zondlo, Bethlehem, both of Pa.

[73] Assignee: Air Products and Chemicals, Inc., Allentown, Pa.

[22] Filed: June 4, 1975

[21] Appl. No.: 583,787

[52] U.S. Cl. .................................. 55/33; 55/58; 55/68; 55/75
[51] Int. Cl.² .................................. B01D 53/04
[58] Field of Search ............ 55/25, 33, 58, 62, 68, 55/75

[56] References Cited
UNITED STATES PATENTS

| | | | |
|---|---|---|---|
| 3,140,931 | 7/1964 | McRobbie | 55/58 X |
| 3,155,468 | 11/1964 | DeMontgareuil et al. | 55/25 |
| 3,533,221 | 10/1970 | Tamura | 55/62 X |
| 3,619,984 | 11/1971 | Domine et al. | 55/25 |
| 3,720,042 | 3/1973 | Simonet | 55/25 |
| 3,788,036 | 1/1974 | Lee et al. | 55/25 |
| 3,796,022 | 3/1974 | Simonet et al. | 55/25 |

Primary Examiner—Frank A. Spear, Jr.
Assistant Examiner—Robert H. Spitzer
Attorney, Agent, or Firm—Richard A. Dannells; Barry Moyerman

[57] ABSTRACT

Ambient air, during an on-stream period, is passed serially through a pretreatment adsorbent bed removing moisture and carbon dioxide therefrom and the thus dried and purified air then passed through a main adsorbent bed selective for retention of nitrogen, the oxygen-rich effluent being collected in an expandable receiving vessel. Nitrogen of high purity, is desorbed by suction from the main bed in a direction chamber to that of the initial air charge and passes from the main bed into and through the pretreatment bed to a collection vessel. Preceding the vacuum desorption step both the pretreatment bed and the main bed are rinsed with the high purity nitrogen product gas from a previous stage in the operation. Following evacuation the beds are repressured with a portion of the oxygen-rich gas drawn from the expandable receiving vessel. At least two parallel trains of adsorbent beds are employed in alternating timed sequence for continuity of operation. By operation in the described manner there are recovered for any desired use, nitrogen of high purity and an oxygen-enriched gas product.

10 Claims, 1 Drawing Figure

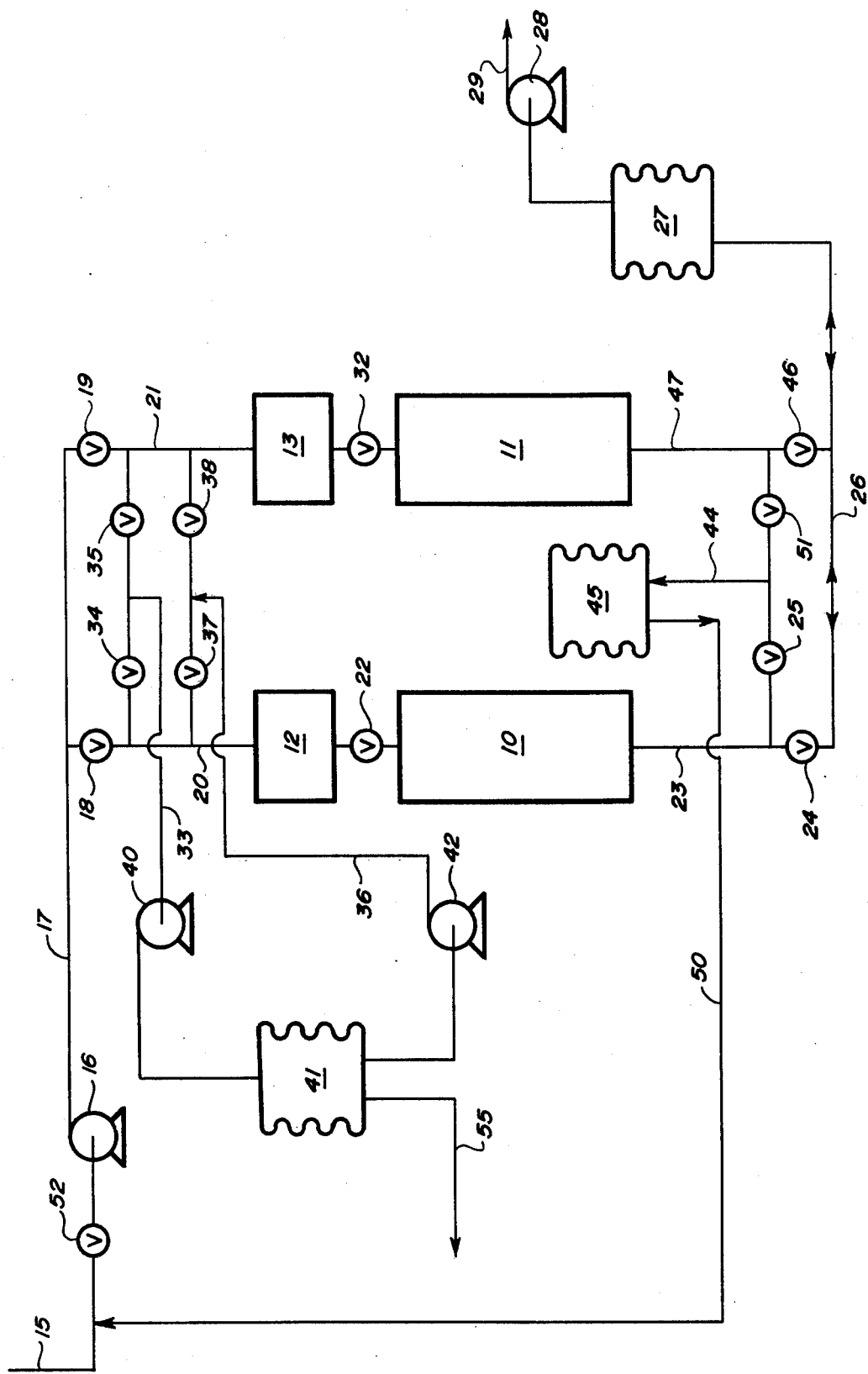

FRACTIONATION OF AIR BY ADSORPTION

BACKGROUND OF THE INVENTION

1. Field of the Invention

The present invention relates to fractionation of air by selective adsorption and is particularly concerned with a vacuum swing system permitting recovery from ambient moisture and carbon dioxide laden air, of separate product fractions including a high purity nitrogen product and an oxygen-enriched gas fraction.

2. Discussion of Prior Art Systems

Numerous and diverse systems are described in the patent literature for separation of gases by preferential adsorption. Typical among these, particularly designed or asserted to be useful in the recovery from air of an enriched oxygen product, are the pressure swing adsorption systems described in U.S. Pat. Nos. 2,944,627; 3,564,816; 3,636,679 and 3,717,974. The systems described in these patents utilize zeolite molecular sieves as adsorbents and involve intricate cycle time operational sequences necessitating complex valve arrangements for their operation. To the extent that these patents are concerned with separation of the component gases of air, only a single product gas typically an oxygen-rich product, is generally recovered from the feed. In U.S. Pat. No. 2,944,627, one of the described embodiments is designed to recover from air oxygen rich product gas as well as a product gas concentrated in nitrogen. In this described embodiment, however, separate trains of adsorbent columns are employed, each having an individual air feed, one of said trains being provided with adsorbent selective for retention of nitrogen and recovery of an oxygen-rich product, while the other train employs adsorbent selective for retention of oxygen and recovery of a nitrogen-enriched product stream. Desorbed gas from each train is cross-recylced to the other to supplement the fresh air feed.

Certain of the prior art systems employ in advance of the adsorbent column or bed a pretreatment adsorbent bed provided with adsorbent intended for removal of carbon dioxide and moisture from the air feed prior to contact with the main bed of adsorbent. Typical patents employing this feature include: U.S. Pat. Nos. 2,944,627; 3,140,931; 3,533,221; 3,719,025 and 3,796,022.

Systems have been described in the patent art designed particularly for the selective production from air of a high purity nitrogen product. These systems, as in U.S. Pat. No. 3,796,022, operate by preferential adsorption of nitrogen from air on a molecular sieve zeolite with subsequent recovery of the nitrogen product by vacuum desorption. These heretofore described systems, among other drawbacks, operate at a poor separation efficiency, since in order to obtain nitrogen of desired high purity a large portion of the nitrogen in the feed is wasted and the oxygen fraction, even at the low extent that it is recovered, is usually of poor quality.

SUMMARY OF THE INVENTION

In accordance with the present invention an improved pressure-swing adsorption process for fractionation of air is provided, whereby there can be recovered from the ambient air feed not only a high yield of high purity nitrogen but also, at the same time, an increased yield of separated product gas rich in oxygen.

The practice of the invention involves principally the following sequence of steps:

1. Adsorption

Ambient air is passed through a pretreatment adsorbent column to remove moisture and carbon dioxide and then passed through a column of adsorbent selective in retention of the nitrogen component, which column has been presaturated with oxygen-rich gas from a previous step in the cycle. The unadsorbed gas discharged from the column as primary effluent constitutes the oxygen-rich product gas, a part of which is subsequently returned to the column in a later step for presaturation of the adsorbent therein, and the remainder withdrawn for any desired use.

2. Nitrogen rinse

The adsorption step is continued until incipient breakthrough of air occurs or somewhat short of it depending on the desired concentration of the oxygen-enriched product. At this time flow of ambient air is discontinued and the bed of adsorbent washed with high purity nitrogen collected from a previous step in the cycle, so as to saturate the bed with nitrogen. The exit gas during this step is collected and may be added to the fresh air feed in the next adsorption step. Since this exit gas is dry and free of $CO_2$ and has an $O_2$ concentration approximately equal to that of feed air, the addition thereof to the feed gas reduces the water and $CO_2$ levels in the feed to the pretreatment bed, thus permitting reduction in the size of that bed and also increasing the efficiency of $O_2$ and $N_2$ recovery.

3. Desorption

The nitrogen saturated bed is next evacuated and high purity nitrogen thus desorbed, including most of that retained in the adsorbent during the adsorption step. Part of the desorbed gas is recovered as high purity nitrogen product for any desired use, while the remainder is employed as the nitrogen rinse gas (step 2) in a subsequent cycle. Desorption of the pretreatment column is continued to a final pressure below that of the nitrogen adsorption column.

4. Presaturation

Evacuation is discontinued when the desired low pressure is reached in the bed and oxygen-rich product gas introduced thereto to saturate the bed and bring the same back substantially to desired adsorption pressure.

5. The recycle is repeated starting with step 1.

At least two trains of adsorbent beds are preferably employed, each train comprising a pretreatment bed and a main bed, the trains being operated in alternate timed sequence, so that the charge of air can be switched from one to the other in intervening periods.

The method for practicing the invention will be better understood and certain of its advantages appreciated from the detailed description of the preferred embodiment which follows, read in connection with the accompanying drawing.

BRIEF DESCRIPTION OF THE DRAWINGS

The single FIGURE is a schematic flow diagram illustrative of a system adapted for practice of the invention.

DETAILED DESCRIPTION OF THE INVENTION

The nitrogen selective adsorbent is contained in two parallel adsorbent columns 10 and 11, operated alternately in timed sequence. Upstream of columns 10 and 11 respectively, are adosrbent beds 12 and 13 containing solid adsorbent effective in removal of water and $CO_2$ from the incoming gas prior to its admission to column 10 or 11.

The ambient air to be fractionated is supplied by line 15 through blower 16 discharging into manifold 17. Alternate feeding of the gas into the adsorbent system comprising beds 12 and 10 as one train and that comprising beds 13 and 11 the other, is had by opening and closing valves 18 and 19 in timed sequence so as to supply the feed air to bed 12 through line 20 during a fixed period with valve 18 open, after which valve 18 is closed and valve 19 opened to supply the feed air to beds 13 and 11 through line 21.

During the on-stream period or air blow period while air, which contains moisture and $CO_2$, is being supplied to pretreatment bed 12 through open valve 18, valve 22 in the line between that bed and bed 10 is open. Moisture and $CO_2$ are selectively removed by the adsorbent in bed 12 and the air, thus dried and freed of these contaminants, then passes into bed 10 containing an adsorbent selective in the adsorption of nitrogen, permitting oxygen-enriched gas to pass through to discharge into line 23, valve 24 being open and valve 25 closed.

Line 23 feeds into discharge line 26, communicating with an expandable chamber 27 in which the oxygen-rich gas is collected and temporarily stored and from which it is withdrawn by pump 28 and line 29 for storage, use or further processing.

The on-stream period of air blow thus described is continued for a time related to the nitrogen adsorption capacity of bed 10; that is, short of the time that the nitrogen front will begin to break through the discharge end of bed 10 and depending on the desired quality of the oxygen-enriched product. The pretreatment bed is sized so that during the on-stream air blow, the bed has an adsorbent capacity sufficient to pick up and hold the moisture and $CO_2$ content of the influent air so that these do not enter bed 10.

During this period while beds 10 and 12 are on air blow, beds 11 and 13 are being evacuated. This is accomplished through line 21, with valve 19 being closed, and valve 32 between beds 11 and 13 being open. The previously adsorbed nitrogen in bed 11 is now desorbed in a flow direction counter to the initial air blow supplied to that bed, and in the embodiment illustrated in the accompanying drawing, passes upwardly through bed 11 through open valve 32 into bed 13, thence into line 21.

As shown in the illustrated embodiment of the invention, parallel lines 20 and 21, each communicates with a common nitrogen discharge line 33, respectively through valves 34 and 35. Lines 20 and 21 also communicate with a common nitrogen supply line 36 respectively through valves 37 and 38. With valve 35 being open, and valves 19, 38, 34 and 37 being closed during evacuation of beds 11 and 13, the desorbing nitrogen passes through open valve 35 into discharge line 33 under suction of vacuum pump 40 and is discharged into expandable nitrogen storage chamber 41.

Evacuation of beds 11 and 13 is continued in the same manner during the next following period in the sequence of operations, while beds 12 and 10 undergo rinse with nitrogen at the termination of air blow thereto. Nitrogen rinse of beds 12 and 10 is effected in the same gas flow direction as the air blow. Nitrogen from storage in vessel 41 is withdrawn by pump 42 and is passed by line 36 through open valve 37 and line 20 into bed 12. During this step, of course, valves 18, 19, 34 and 38 remain closed. The supplied rinse nitrogen passes from bed 12 through open valve 22 into bed 10. At the discharge end of bed 10, valve 24 being closed, the rinse gas flows through now opened valve 25 and line 44 into rinse gas collection vessel 45. Throughout this period while beds 12 and 10 are being rinsed with nitrogen, beds 11 and 13 continue to be evacuated as already described.

In the next step in the sequence, while beds 12 and 10 continue to be rinsed with nitrogen and evacuation of bed 13 is continued, bed 11 is subjected to rinsing or repressuring with oxygen-rich gas. This is accomplished by now closing valve 32 to discontinue gas flow communication between beds 11 and 13, and opening valve 46 in line 47 at the oxygen discharge end of bed 11. Oxygen rich gas from vessel 27 thus flows into the previously evacuated bed 11 and brings that bed to desired operating pressure for the subsequent on-stream air blow.

In the next step in the sequence, the nitrogen rinse of beds 12 and 10 is terminated and these beds subjected to evacuation; also at this stage bed 13 is opened to flow of oxygen-rich gas from vessel 27 through bed 11, achieved by now opening valve 32 and closing valve 35, while valve 46 remains open. Evacuation of beds 10 and 12 is effected, as heretofore described in a previous stage of the sequence applied to beds 11 and 13. Thus, with valves 24 and 25 closed, the previously adsorbed nitrogen gas from bed 10 is desorbed by suction and withdrawn into bed 12 and thence through line 20 and opened valve 34 into nitrogen discharge line 33 and vessel 41, under the influence of vacuum pump 40.

Evacuation of beds 10 and 12 in the manner above described is continued for the next two time periods while certain operational changes are effected sequentially in beds 11 and 13. Beds 11 and 13 having been rinsed or repressured by flow of oxygen-rich gas into these from vessel 27, these beds are now ready to receive the charge of air to be fractionated. Accordingly, while beds 12 and 10 are still being evacuated, the flow of ambient air from manifold 17 is directed through line 21 and opened valve 19 into bed 13, valves 35 and 38 remaining closed. Moisture and $CO_2$ are removed from the incoming air in bed 13 and the thus dried and prepurified air flows through opened valve 32 into bed 11 wherein nitrogen is selectively adsorbed and the oxygen-enriched air thus obtained is discharged from bed 11 into line 47 from which it flows through open valve 46 and line 26 into vessel 27. During this period also, the gas from vessel 45 is withdrawn through line 50 and charged to the inlet of pump 16 joining the ambient feed air supplied thereto by line 15. The feed air being thus diluted by the recycled gas from vessel 45 which is free of moisture and $CO_2$, reduces the burden placed on beds 12 and 13 in their turn.

At the interruption of the air blow to beds 13 and 11, valve 19 is closed, and valve 38 opened, to permit flow of nitrogen rinse gas into bed 13, pumped from vessel 41 through line 36. The nitrogen gas passes from bed 13 through open valve 32 into bed 11 and is discharged through line 47. During this time valve 46 is closed and valve 51 opened to permit the discharged nitrogen to flow into vessel 45 through line 44.

The next stage in the sequence, while beds 13 and 11 are still being rinsed with nitrogen, involves the closing of valve 22, so that evacuation of bed 12 is continued alone, while bed 10 is now subjected to rinsing or repressuring with oxygen-rich gas from vessel 27, via lines 26 and 23 through open valve 24. After completion of this repressuring of bed 10, and completed evacuation of bed 12, valve 22 is reopened to permit flow of the oxygen-rich gas into bed 12 to bring that bed up to the desired on-stream operating pressure. Such repressuring of bed 12 constitues the last stage in the sequence, after which on-stream supply of ambient air from line 15 together with recylced gas from vessel 45 will be resumed, to repeat the cycle of operations already described. During this last stage in the sequence, beds 11 and 13 are placed on evacuation by now closing valves 34, 51 and 38, and opening valve 35, thus effecting desorption of beds 11 and 13, through line 33, sucked by pump 40 into vessel 41. Vessel 41 is provided with a discharge line 55 through which nitrogen of high purity can be withdrawn from that vessel for desired use.

In the embodiment illustrated by the accompanying drawing two main beds of adsorbent in parallel each provided with a pretreatment bed, operate in a scheduled sequence, wherein each main bed undergoes in sequential order air blow, nitrogen rinse and desorption of nitrogen by evacuation, followed by repressuring with oxygen-rich gas. In such system there are time periods during which neither main bed is receiving ambient air. During the periods that valves 18 and 19 are both closed, pump 16 may be permitted to idle by temporarily shutting off air supply thereto by closing valve 52 in line 15. If desired, more than 2 parallel trains of columns may be employed to maintain continuity of the air blow operation.

Table 1 below illustrates a time program for the various steps in the sequence of operations based on an embodiment employing a suggested 8 minute cycle, and indicating the valve positions during the sequence. It will be understood, however, that the 8 minute cycle described is merely illustrative and other time cycles may be employed in practice of the invention.

While not restricted thereto, it is preferred to operate the air blow at slightly above atmospheric pressure sufficient to accommodate the pressure drop through the adsorbent beds, valves and lines in the system. In the vacuum desorption of the main beds 10 and 11, these are brought to an intermediate pressure of preferably 30 to 100 Torr. The final vacuum desorption of pretreatment beds 12 and 13 is preferably at a final pressure in the range of 10 to 50 Torr. The selected level of vacuum to be utilized in the main adsorbent beds will depend upon the desired purity of the recovered gas products. At the highest purity, of course, there is a corresponding sacrifice in yield quantity. The final pressure or lowest pressure attained by the further evacuation of the pretreatment beds alone, is dictated by the equilibrium vapor pressure of water over the adsorbent selected for removal of water and $CO_2$. In all instances, however, the final pressure attained on desorption of the water — $CO_2$ adsorbent beds will be substantially lower than the final pressure in the nitrogen adsorber beds.

The illustrated embodiment is predicated on a practical system employing two parallel trains of adsorbers operated in a programmed time schedule of one-half cycle out of phase. This insures a continuous flow of product gas and efficient utilization of the gas-handling equipment. In some instances it may be found desirable to employ a time schedule based on three or more parallel trains of adsorbers in appropriate time sequence. The valve changes during the cycle of operations in such modifications are programmed in well known manner and are carried out automatically under control of a cycle timer device.

EXAMPLE 1

A series of experimental runs were carried out employing the operating sequence according to the invention in a 480 second cycle arranged as follows:

TABLE 1

| Time (Secs) | Operations | | | | Valve Positions | | | | | | | | | | | |
|---|---|---|---|---|---|---|---|---|---|---|---|---|---|---|---|---|
| | Pretreat Beds | | Main Beds | | 18 | 19 | 22 | 32 | 24 | 46 | 34 | 35 | 25 | 51 | 37 | 38 |
| | 12 | 13 | 10 | 11 | | | | | | | | | | | | |
| 0–10 | Evac | N₂ Rinse | O₂ Rinse | N₂ Rinse | C | C | C | O | O | C | O | C | C | O | C | O |
| 10–60 | O₂ Rinse | Evac. | O₂ Rinse | Evac. | C | C | O | O | O | C | C | O | C | C | C | C |
| 60–150 | Air blow | Evac. | Air blow | Evac. | O | C | O | O | O | C | C | O | C | C | C | C |
| 150–240 | N₂ Rinse | Evac. | N₂ Rinse | Evac. | C | C | O | O | C | C | O | O | O | C | O | C |
| 240–250 | N₂ Rinse | Evac. | N₂ Rinse | O₂ Rinse | C | C | O | C | C | O | C | O | O | C | O | C |
| 250–300 | Evac. | O₂ Rinse | Evac. | O₂ Rinse | C | C | O | O | C | O | O | C | C | C | C | C |
| 300–390 | Evac. | Air blow | Evac. | Air blow | C | O | O | O | C | O | O | C | C | C | C | C |
| 390–480 | Evac. | N₂ Rinse | Evac. | N₂ Rinse | C | C | O | O | C | C | O | C | C | O | C | O |

O = Open
C = Closed

In pretreatment beds 12 and 13 any solid adsorbent or physical admixture of adsorbents suitable for retaining moisture and $CO_2$ may be employed; such as silica gel, alumina, activated carbon or a zeolitic molecular sieve of natural or synthetic origin, such as mordenite or molecular sieve 5A or 13X. In the main adsorbent beds 10 and 11 the adsorbent may be any molecular sieve material having preferential affinity for adsorption of nitrogen from its admixture with oxygen under the process conditions employed. For this purpose known commercial adsorbents may be utilized such as 5A molecular sieve (calcium zeolite A) or a synthetic mordenite having pore openings of about 5 to 10 Angstrom size, preferably Norton Zeolon 900-Na, which is purported to have pore openings in about the 7 Angstrom range.

| | | |
|---|---|---|
| Air blow | 93 | seconds |
| N₂ rinse | 92.5 | seconds |
| Evacuation | 236.0 | seconds |
| O₂ rinse | 58.5 | seconds |

The main bed contained 1.28 kg. of Norton Zeolon 900-Na adsorbent in the form of 1/6 inch pellets and the pretreatment bed contained 0.338 kg. of 13X molecular sieve adsorbent. The effluent gas during rinse was collected in a receiver corresponding to 45 in the accompanying drawing and was recycled to join the fresh air feed in the proportions shown in Table 2 below, which summarizes the results of typical runs, at the indicated hours of operation. The table is arranged in ascending order of fresh air feed rate.

TABLE 2

| Fresh Feed | Recycled Feed | | | Final Pressure Torr | | $O_2$ Product | | $N_2$ Product | | Hours of Operation |
|---|---|---|---|---|---|---|---|---|---|---|
| l/kg/cycle | l/kg/cycle | % $O_2$ | Main Bed | Pretreat Bed | l/kg/cycle | % $O_2$ | l/kg/cycle | % $N_2$ | | |
| 8.80 | 6.60 | 23.8 | 61.5 | 15.3 | 1.92 | 90.1 | 6.88 | 99.9 | 189 |
| 8.83 | 6.52 | 23.0 | 66.5 | 16.5 | 2.08 | 87.9 | 6.75 | 99.8 | 429 |
| 9.21 | 6.69 | 21.2 | 67.8 | 15.0 | 2.38 | 84.2 | 6.83 | 99.8 | 285 |
| 9.31 | 6.70 | 22.5 | 67.5 | 14.0 | 2.60 | 79.6 | 6.71 | 99.7 | 717 |
| 9.52 | 6.72 | 22.0 | 67.0 | 14.0 | 2.67 | 78.3 | 6.85 | 99.8 | 693 |

The foregoing table is an example of achievement of steady state operation and represents a substantial time period of continuous operation. The data points represent the performance of the laboratory unit for production of at least 99.7% $N_2$ in the $N_2$ rich product and the variation in the quantity of the $O_2$ rich product at different chosen $O_2$ purity levels. It may be seen that recovery of both $O_2$ and $N_2$ from the feed air was more than 95% of the maximum theoretically available.

What is claimed:

1. The method for production of high purity nitrogen and an oxygen-enriched product from air containing water vapor and carbon dioxide, which comprises:
   1. during an on-stream period carried out at substantially atmospheric pressure
      a. introducing ambient air into a first bed of adsorbent effective in adsorption of said water vapor and carbon dioxide;
      b. discharging unadsorbed gaseous effluent from said first adsorbent bed into a second adsorbent bed in series therewith and containing an adsorbent selective in retention of nitrogen as opposed to oxygen;
      c. continuously during said on-stream period withdrawing from said second bed a primary gaseous effluent stream as an oxygen-rich product having a higher oxygen concentration than the air stream charged to said bed;
      d. collecting said primary gaseous effluent in an expandable receiver;
   2. discontinuing introduction of charge to said first bed of adsorbent and initiating removal of contained gases from said first and second beds by
      e. first rinsing said beds with high purity nitrogen gas introduced into said first bed and flowed through said bed into and through said second bed at a rate and for a time period sufficient to effect removal of void air from both beds and short of breakthrough of adsorbed water from said first bed; while collecting the rinse gas effluent from said second bed in a receiver separate from that in which said primary effluent was collected;
      f. discontinuing introduction of said rinse gas to said first bed and the flow thereof to said second bed;
      g. reducing the pressure at the air inlet end of said first bed while retaining gas flow communication between said first and second beds and causing substantially all of the nitrogen retained by said adsorbent during step (b) to flow through said first bed, thereby inducing desorption of water vapor and carbon dioxide from said first bed and desorption of nitrogen from said second bed;
      h. collecting the desorbed gases rich in nitrogen in an expandable receiver, a portion of which collected gases from said receiver is employed as rinse gas in step (e);
      i. thereafter discontinuing gas flow communication between said second and first bed, while continuing withdrawal of gas only from said first bed to a further reduced pressure level;
      j. during said continued withdrawal of gas from said first bed introducing into said second bed a portion of the oxygen-rich primary effluent from step (d) thereby restoring said second bed to substantially its initial on-stream pressure;
      k. thereafter discontinuing withdrawal of gas from said first bed and restoring gas flow communication between said second and first bed to permit flow of contained pressuring gas from said second to said first bed to bring said first bed to substantially its on-stream pressure;
   l. when said first bed has substantially reached its on-stream pressure again initiating a new cycle in the recited sequence with an on-stream period commencing with step (a).

2. The method as defined in claim 1 wherein at least a portion of the rinse gas effluent from step (e) is recycled for addition to the ambient air feed introduced into the adsorbent bed in step (a).

3. The method as defined in claim 1 wherein during said desorption of gas from said second bed in step (g), the pressure level in said bed is lowered to about 30–100 Torr.

4. The method as defined in claim 3 wherein desorption of gas from said first bed in step (i), is continued to a final reduced pressure level of 10–50 Torr.

5. The method as defined in claim 1 wherein desorption of gas from said first bed in step (i) is continued to a final reduced pressure level of 10–50 Torr.

6. The method as defined in claim 1 wherein the defined cycle of operations is carried out in parallel in at least two trains of such first and second series-connected beds in offset time sequence, whereby during gas removal from a first bed of one train, the first bed of another parallel train undergoes successively the steps of repressuring (k), ambient air introduction (a), and rinsing with nitrogen (e).

7. The method as defined in claim 1 wherein the defined cycle of operations is carried out in offset time sequence in parallel in two similar trains of adsorbent beds each having a first and second bed in series, whereby during gas removal at reduced pressure from the second bed of one such train, the second bed in the parallel train is subjected to the sequence; repressuring (k), ambient air introduction (a), and rinsing with nitrogen (e).

8. The method of fractionating atmospheric air by selective adsorption for separate recovery of high purity nitrogen and oxygen-enriched product streams and wherein said atmospheric air is pretreated by contact with an adsorbent bed effective in removal of water vapor and $CO_2$ contained in said atmospheric air, which method comprises introducing the atmospheric air in alternate sequence into a first adsorbent train comprising a sequence of pretreatment bed and an air fractionating bed and a like second adsorbent train comprising in sequence a pretreatment bed and an air fractionating bed, each of said air fractionating beds containing molecular sieve zeolite effective in selective adsorption of nitrogen from air, said adsorbent trains being operated in a time sequence such that the respective beds simultaneously undergo during successive time periods the following operations:

1. passing atmospheric air through said first train and collecting unadsorbed effluent as an oxygen enriched product stream while said second train is being evacuated to an intermediate pressure;
2. rinsing said first train with high purity nitrogen product gas while said evacuation of the second train is continued;
3. while said rinsing of the first train is continued terminating the evacuation of the air fractionating bed of said second train and initiating the initiating the repressuring of said bed with oxygen-rich gas, while continuing evacuation of the pretreatment bed of said second train to a lower pressure level;
4. terminating nitrogen rinsing of said first train and subjecing that train to evacuation while retaining gas flow communication between the beds of said first train to cause substantially all of the nitrogen retained by said zeolite in said air fractionating bed during step (1) to flow through said pretreatment bed, during which period flow communication between the beds of said second train is established to permit flow of oxygen-rich repressuring gas from the nitrogen-adsorbent bed to the pretreatment bed of the second train;
5. during continued evacuation of said first train initiating flow of atmospheric air through said second train and collection of unadsorbed effluent as an oxygen-enriched product stream;
6. during further continued evacuation of said first train, discontinuing air introduction to said second train and rinsing said second train with high purity nitrogen product gas;
7. while said rinsing of the second train with nitrogen gas is continued, interrupting gas flow communication between the pretreatment bed and the nitrogen-adsorbing bed of said first train and repressuring the latter with oxygen-rich gas while continuing evacuation of the pretreatment bed of said first train to a lower pressure level;
8. thereafter reestablishing gas flow communication between the beds of said first train to permit flow of repressuring gas from the nitrogen adsorbent bed to the pretreatment bed of that train, while discontinuing the nitrogen rinsing of said second train and initiating evacuation of that train;
9. and thereafter repeating the foregoing sequence of operations starting with (1) above.

9. The method as defined in claim 8, wherein the repressuring gas employed in operations (3) and (7) above comprises part of the unadsorbed effluent collected in operations (1) and (5) above as said oxygen-enriched product streams.

10. The method defined in claim 8, wherein the rinsing gas employed in nitrogen rinse steps (2) and (6) above, comprises part of the collected evacuated gas.

* * * * *